(12) United States Patent
Pavuk

(10) Patent No.: US 7,070,177 B2
(45) Date of Patent: Jul. 4, 2006

(54) SANDWICH DESIGN OF FOUR BAG SUSPENSION FOR BUS AND COACH REAR DRIVE AXLES

(75) Inventor: Gregory D. Pavuk, Royal Oak, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/369,414

(22) Filed: Feb. 18, 2003

(65) Prior Publication Data

US 2004/0159995 A1    Aug. 19, 2004

(51) Int. Cl.
  *B60G 21/00*    (2006.01)
  *B60G 21/06*    (2006.01)
  *F16F 7/00*     (2006.01)
  *F16F 9/00*     (2006.01)

(52) U.S. Cl. ............... 267/222; 267/254; 188/219.1; 280/124.109

(58) Field of Classification Search ............... 267/216, 267/222, 225, 230, 248, 251, 254, 274, 64.16; 188/219.1; 280/785, 124.109; 180/312; 296/203.01, 204, 35.1; 29/897, 897.2
See application file for complete search history.

(56) References Cited

U.S. PATENT DOCUMENTS

| | | | | |
|---|---|---|---|---|
| 880,025 A | * | 2/1908 | Herman | ...................... 280/785 |
| 1,495,171 A | * | 5/1924 | Fraser | ....................... 296/35.1 |
| 1,708,217 A | * | 4/1929 | Fraser | ................. 280/124.166 |
| 2,249,212 A | * | 7/1941 | Kolbe | ................. 280/124.103 |
| 2,431,524 A | * | 11/1947 | Lindsay et al. | ............. 296/204 |
| 2,589,043 A | | 3/1952 | Brewen | |
| 2,620,742 A | * | 12/1952 | Watter | ....................... 105/180 |
| 2,901,266 A | * | 8/1959 | Lindsay | ...................... 280/785 |
| 3,565,456 A | | 2/1971 | Zoltok | |
| 3,896,895 A | * | 7/1975 | Schultz et al. | .............. 180/370 |
| 3,912,295 A | * | 10/1975 | Eggert, Jr. | ................... 280/784 |
| 4,343,375 A | * | 8/1982 | Manning | ..................... 180/353 |
| 4,453,740 A | * | 6/1984 | von der Ohe et al. | ...... 280/781 |
| 4,461,218 A | * | 7/1984 | Kuhlow et al. | ............. 105/137 |
| 4,941,543 A | * | 7/1990 | Ewen | .......................... 180/254 |
| 5,012,885 A | * | 5/1991 | Hilden | ....................... 180/254 |
| 5,188,195 A | * | 2/1993 | Haustein | ..................... 180/353 |
| 5,599,038 A | * | 2/1997 | German | ............... 280/124.175 |
| 5,749,595 A | * | 5/1998 | Hoss et al. | ............ 280/124.17 |
| 6,702,265 B1 | * | 3/2004 | Zapletal | ..................... 267/187 |

FOREIGN PATENT DOCUMENTS

DE    19754427    *    6/1999

OTHER PUBLICATIONS

European Search Report, Dec. 2, 2004.

* cited by examiner

Primary Examiner—Devon Kramer
(74) Attorney, Agent, or Firm—Carlson, Gaskey & Olds

(57) ABSTRACT

A suspension assembly comprises four springs spaced at four distinct locations. A first plate extends to support each of the springs at each location. An axle is connected to the first plate.

16 Claims, 2 Drawing Sheets

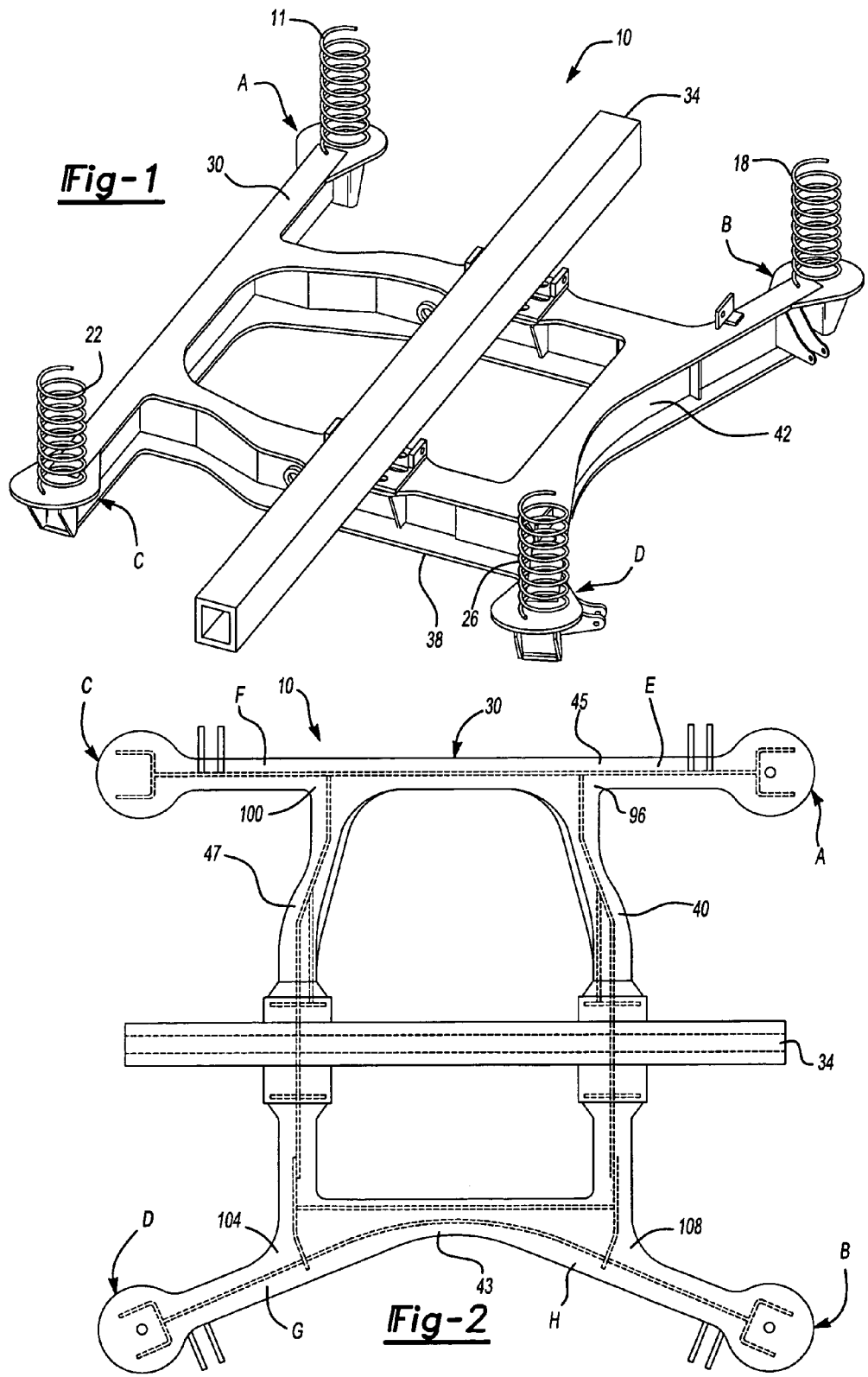

SANDWICH DESIGN OF FOUR BAG SUSPENSION FOR BUS AND COACH REAR DRIVE AXLES

BACKGROUND OF THE INVENTION

Suspension assemblies for bus and coach rear drive axles typically comprise four air springs, also known as "bags," spaced at four separate locations to support the frame of the bus or coach on the axle. Such assemblies usually have two lateral tubes that connect the air springs from side-to-side and two fabricated I-beams, which connect the axle to these lateral tubes. The lateral tubes are welded to the I-beams. Welds are placed either on the top and/or bottom of the tubes at the intersection of the tubes and the I-beams.

The intersection of the I-beams and the tubes is subject to significant stress as part of the vehicle suspension. Consequently, the welds in these areas are also subject to significant stress. Due to the difference in geometry between the tubes and the I-beam, welds at the top and/or bottom surfaces of the lateral tubes serve as stress risers. Moreover, heat from the welding process may change the material properties at the location of the weld, weakening the strength of the material. This combination of stress and weakened material may shorten part life.

A need therefore exists for a suspension assembly that avoids the weld problems that occur at the intersection of the tubes and the I-beam.

SUMMARY OF THE INVENTION

Like existing suspension assemblies, the inventive suspension assembly has four springs spaced at four different locations. However, rather than employ separate tubes and I-beams to support each spring, a unitary plate is used. This plate is sized to support each spring at each location as well as to support a vehicle axle. In this way, the inventive suspension assembly eliminates the need for lateral tubes and I-beams and avoids unreceptive weld geometry. The inventive assembly accordingly leads to longer part life.

The suspension assembly may have additional bracing. A second plate may be spaced from the first plate and serve to also support each spring at each location, like the first plate. Webbing may attach the first plate to the second plate and may extend across these plates. Webbing may be doubled to provide greater strength to areas that require such support.

Accordingly, the suspension assembly may comprise four springs spaced at four different locations with a generally horizontal upper plate extending to support each spring at each location. Another generally horizontal plate may be spaced from the first plate by a vertical support to provide further strength to the assembly. The axle may be connected to the first plate.

The inventive suspension assembly may be manufactured by spacing four springs at four different locations. A first and second plate may be sized to extend to each of the four different locations of the springs. The first plate is spaced from the second plate and mounted to the second plate. An axle may be attached to one of the plates. A support, such as webbing, may be sandwiched between these plates.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 illustrates the inventive suspension assembly, showing springs, first plate, second plate and axle.

FIG. 2 illustrates an overhead view of the inventive suspension assembly of FIG. 1.

DETAILED DESCRIPTION OF THE PREFERRED EMBODIMENT

Figure 3:
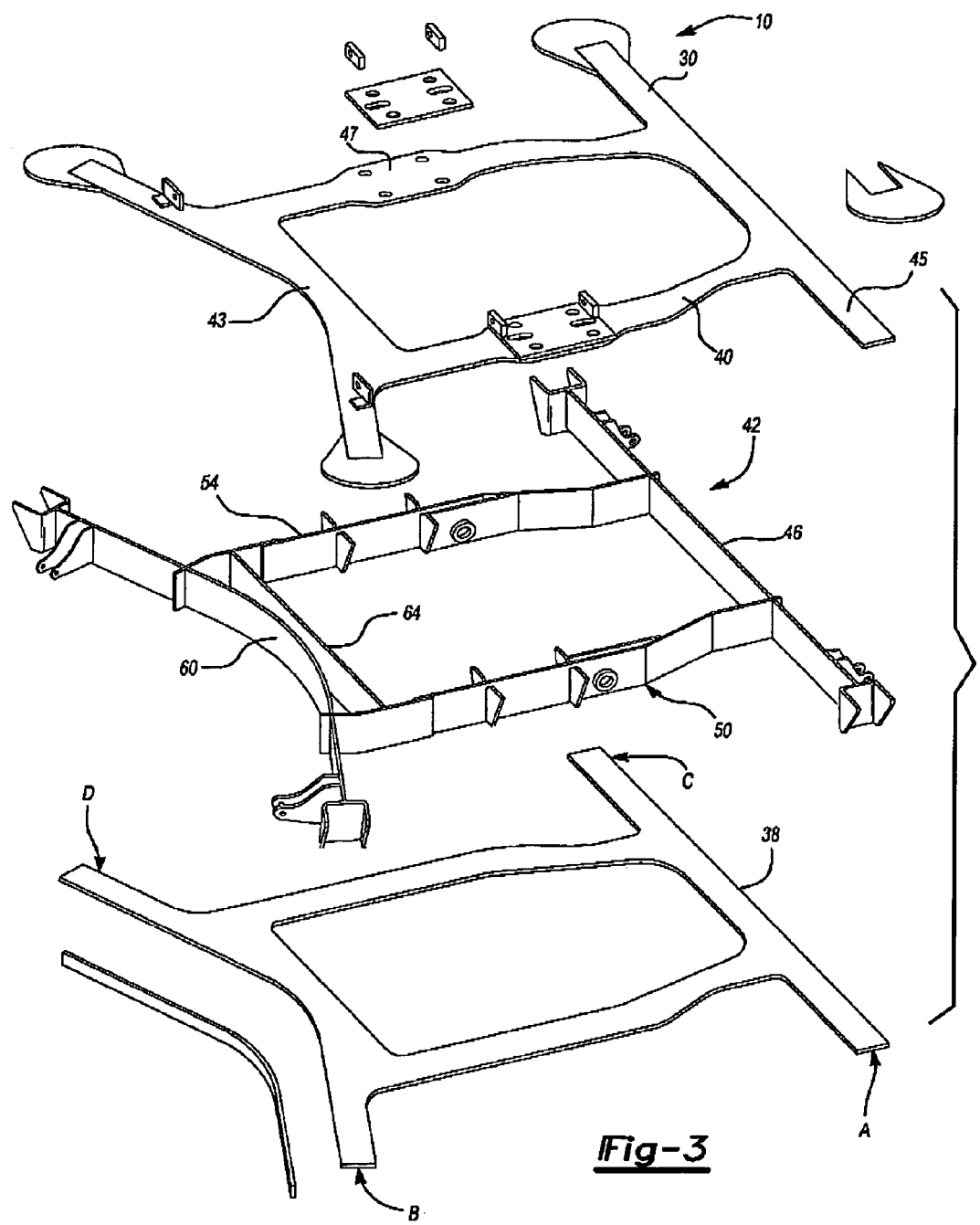
FIG. 3 illustrates an exploded view of the inventive suspension assembly of FIGS. 1 and 2.

FIG. 1 illustrates inventive suspension assembly 10. Suspension assembly 10 comprises four springs, such as air springs, spaced at locations A, B, C and D. Springs 11, 18, 22 and 26, such as air springs, are mounted as known to first plate 30, which is sized to extend to support each spring at locations A, B, C and D. Preferably, plate 30 is of unibody or unitary construction so that stress may be distributed across first plate 30 without the weak points associated with joined pieces. Spaced from first plate 30 is second plate 38, which may mirror the size and shape of first plate 30 so as to provide additional support to springs 11, 18, 22 and 26 at locations A, B, C and D, respectively. Second plate 38 is also preferably of unibody or unitary form. First plate 30 is mounted to second plate 38 by support 42, which is sandwiched between each plate 30, 38. Axle 34 is attached to first plate 30 by known techniques.

FIG. 2 illustrates a plan view of suspension assembly 10. As shown in this figure, first plate 30 extends to each location A, B, C and D without the welding seams that are typically found at locations E, F, G and H when lateral tubes and I-beams are employed in known designs. Hence, rather than use two lateral tubes and two I-beams to support the four springs at locations A, B, C and D, a single plate 30 may be cut to extend to each of these locations. First plate 30 may comprise first lateral portion 45 that extends from location A to location C and second lateral portion 43 that extends from location B to location D. Interconnecting these lateral portions 43, 45 to each other are first transverse portion 47 and second transverse portion 40. Portions 40, 43, 45 and 47 preferably form a single plate. Portion 45 interconnects to portions 47 and 40 at intersections 100 and 96, respectively, while portion 43 interconnects to portions 47 and 40 at intersections 104 and 108 respectively.

FIG. 3 illustrates an exploded view of the suspension assembly of FIGS. 1 and 2. First plate 30 is spaced from second plate 38. Between first plate 30 and second plate 38 is support 42, which serves to mount first plate 30 to second plate 38 in a sandwich-like manner. Support 42 may comprise webs that extend between first plate 30 and second plate 38. As shown, web 46 extends along the length of first lateral portion 45 from location A to location C. Web 60 may extend along the length of second lateral portion 43 from location B to location D. Spaced from web 60 is web 64, which serves as a rear brace that provides additional support to assembly 10.

In addition, web 50 may extend along the length of transverse portion 40 while web 54 may extend along the length of transverse portion 47. Webs 46, 50, 54, 60 and 64 may comprise a single piece or multiple pieces that are welded together as known. Further, support 42 is attached to first plate 30 and second plate 38 by welding. It is preferable that the welds be located inside of plates 30 and 38 and the oriented parallel to the bending axis of the anticipated load on assembly 10 instead of against it. In this way, welds are not placed at potential locations of cracking.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

We claim:

1. A suspension assembly, comprising:
   a first spring support sized to receive a first spring, a second spring support sized to receive a second spring, a third spring support sized to receive a third spring, and a fourth spring support sized to receive a fourth spring spaced at four distinct locations;
   a first continuous plate extending to each of said four distinct locations; and
   an axle operatively connected to said first continuous plate, said first continuous plate comprising a first lateral portion extending from said first spring support to said second spring support and a second lateral portion longitudinally spaced from said first lateral portion, said second lateral portion extending from said third spring support to said fourth spring support, and said first continuous plate further comprising a first transverse portion extending from said first spring support to said third spring support and a second transverse portion laterally spaced from said first transverse portion, said second transverse portion extending from said second spring support to said fourth spring support wherein said first transverse portion and said second transverse portion intersect said first lateral portion transversely with said axle being disposed between said first lateral portion and said second lateral portion.

2. The suspension assembly of claim 1, including a second continuous plate spaced from said first continuous plate, said first and second continuous plates being generally parallel to each other.

3. The suspension assembly of claim 2, wherein said second continuous plate extends to each of said four distinct locations and is parallel to said first contiguous plate at each of said four distinct locations.

4. The suspension assembly of claim 3, including a support extending between said first continuous plate and said second continuous plate.

5. The suspension assembly of claim 4, wherein said support comprises at least one web welded to said first continuous plate and said second continuous plate.

6. The suspension assembly of claim 5, wherein said first transverse portion and said second transverse portion intersect said second lateral portion transversely, said first lateral portion being generally parallel to said second lateral portion and said first transverse portion being generally parallel to said second transverse portion.

7. The suspension assembly of claim 1, wherein said axle is rigidly fixed to an upper surface of said first continuous plate.

8. The suspension assembly of claim 1 wherein said first continuous plate comprises a generally flat single plate formed as a unitary structure, with said first, second, third, and fourth spring supports being generally co-planar with said generally flat single plate.

9. The suspension assembly of claim 1 wherein said first lateral portion intersects said first transverse portion at a first intersection and intersects said second transverse portion at a second intersection, at least one of said first intersection and said second intersection formed in one piece.

10. The suspension assembly of claim 9 wherein said at least one of said first intersection and said second intersection is formed in one piece without welding.

11. The suspension assembly of claim 1, wherein said axle crosses over said first transverse portion and said second transverse portion.

12. A suspension assembly, comprising:
    a first spring, a second spring, a third spring, and a fourth spring spaced at four distinct locations;
    a first plate extending to support each of said first, second, third and fourth springs at each of said four distinct locations;
    a second plate spaced from said first plate extending to support each of said first, second, third and fourth springs at each of said four distinct locations, said second plate being generally parallel to said first plate and wherein each of said first and second plates comprise a first lateral portion, a second lateral portion longitudinally spaced from said first lateral portion, a first transverse portion, and a second transverse portion laterally spaced from said first transverse portion, wherein said first lateral portion extends from said first spring to said second spring, said second lateral portion extends from said third spring to said fourth spring, said first transverse portion extends from said first spring to said third spring, and said second transverse portion extends from said second to said fourth spring, said first transverse portion and said second transverse portion intersecting said first lateral portion and said second lateral portion transversely;
    a support extending between said first plate and said second plate, said support mounting said first plate to said second plate; and
    an axle mounted to at least one of said first and second plates, said axle being disposed between said first lateral portion and said second lateral portion and crossing over said first transverse portion and said second transverse portion.

13. The suspension assembly of claim 12, wherein said support comprises a plurality of webs including at least a first web extending along said first lateral portion, a second web extending along said second lateral portion, a third web extending along said first transverse portion, and a fourth web extending along said second transverse portion.

14. A method of manufacturing a suspension assembly, comprising the steps of:
    spacing at least four springs from each other at four different locations wherein the at least four springs comprise at least a first spring, a second spring, a third spring, and a fourth spring;
    forming a first plate sized to extend to each of the four different locations;
    forming a second plate sized to extend to each of the four different locations;
    forming the first and second plates as mirror images of each other with each of the first and second plates having a first lateral portion,
a second lateral portion longitudinally spaced from the first lateral portion,
a first transverse portion, and
a second transverse portion laterally spaced from the first transverse portion, wherein the first lateral portion extends from the first spring to the second spring, the second lateral portion extends from the third spring to the fourth spring, the first transverse portion extends from the first spring to the third spring, and the second transverse portion extends from the second spring to the fourth spring, the first transverse portion and the second transverse portion intersecting the first lateral portion and the second lateral portion transversely;

spacing the first plate from the second plate in a generally parallel relationship;

mounting the first plate to the second plate by welding a support structure to the first plate and the second plate; and fixing an axle to at least one of the first and second plates with the axle being disposed between the first lateral portion and the second lateral portion and crossing over the first transverse portion and the second transverse portion.

15. The method of claim 14 including forming the support structure with a plurality of webs including a first web extending along the first lateral portion, a second web extending along the second lateral portion, a third web extending along the first transverse portion, and a fourth web extending along the second transverse portion with the first and second webs being generally parallel to each other, and the third and fourth webs being generally parallel to each other.

16. The method of claim 14 including fixing the axle to an upper surface of the first plate such that the first plate, the second plate, and the support structure are all positioned vertically underneath the axle, positioning the axle between the first and second lateral portions, and extending the axle across the first and second transverse portions.

* * * * *

UNITED STATES PATENT AND TRADEMARK OFFICE
CERTIFICATE OF CORRECTION

PATENT NO. : 7,070,177 B2  
APPLICATION NO. : 10/369414  
DATED : July 4, 2006  
INVENTOR(S) : Gregory D. Pavuk Page 1 of 1

It is certified that error appears in the above-identified patent and that said Letters Patent is hereby corrected as shown below:

Claim 3, Column 3, line 47: "contiguous" should be --continuous--

Signed and Sealed this

Seventeenth Day of October, 2006

JON W. DUDAS  
*Director of the United States Patent and Trademark Office*